UNITED STATES PATENT OFFICE 2,345,208

PROCESS FOR MAKING AMINOTHIAZOLINES

Roger A. Mathes, Akron, Ohio, assignor to The B. F. Goodrich Company, New York, N. Y., a corporation of New York No Drawing. Application April 15, 1942,
Serial No. 439,095

9 Claims. (Cl. 260—302)

This invention relates to a process for the preparation of 2-aminothiazolines and pertains specifically to a method which comprises reacting a 2-mercaptothiazoline with a primary or secondary amine.

The 2-aminothiazolines are useful as insecticides, fungicides, and as accelerators for the vulcanization of natural or synthetic rubber which can be vulcanized with sulfur. They are also of interest as pharmaceuticals. By the term "2-aminothiazoline" is meant compounds having the structure

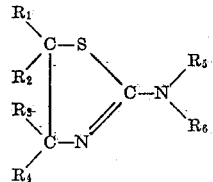

where $R_1$, $R_2$, $R_3$, and $R_4$ are hydrogen, hydrocarbon, or alkoxy groups, $R_5$ is a hydrocarbon group, and $R_6$ is hydrogen or a hydrocarbon group. Compounds containing two or more 2-aminothiazoline groups, as for example compounds in which $R_5$ of the foregoing formula is the group

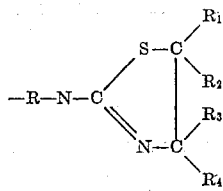

where R is a hydrocarbon group may also be used. Although the hydrocarbon groups, which may be aromatic, aliphatic, or cycloaliphatic, saturated or unsaturated, may contain various substituent groups, such as nitro, halo, ether, thioether, etc., they are preferably unsubstituted. The two nuclear carbon atoms may be connected to the ends of a hydrocarbon chain, as for example in the 4,5-cyclotetramethylene thiazolines.

My process of preparing 2-aminothiazolines comprises reacting a 2-mercaptothiazoline of the formula

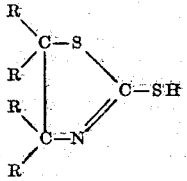

where R represents hydrogen, hydrocarbon, or alkoxy groups, with an organic compound containing the group

Among the most important compounds containing this group are the primary and secondary amines, that is, amines having at least one amino hydrogen atom. The amines may be aliphatic or aromatic, and may contain more than one amino group. Among the 2-mercaptothiazolines which may be employed in my process are 2-mercaptothiazoline, 2-mercapto-4-methylthiazoline, 2-mercapto-5-methylthiazoline, 2-mercapto-4,5-dimethylthiazoline, 2-mercapto-4-ethylthiazoline, 2-mercapto-5-ethylthiazoline, 2-mercapto-4,5-diethylthiazoline, 2-mercapto-4-methoxythiazoline, 2-mercapto-4-ethoxythiazoline, 2-mercapto-5-ethoxythiazoline, 2-mercapto-4-phenylthiazoline, 2-mercapto-4-benzylthiazoline, 2-mercapto-4,5-4,5-cyclotetramethylenethiazoline and similar compounds. Suitable amines for my process comprise the aliphatic primary and secondary amines such as methyl, ethyl, n-propyl, i-propyl, n-butyl, sec-butyl, n-amyl, n-hexyl, allyl, crotyl, dimethyl, diethyl, di-n-propyl, di-i-propyl, di-n-butyl, methyl ethyl, methyl-n-butyl, ethyl-n-hexyl, i-propyl-n-butyl, cyclohexyl, benzyl, ethyl cyclohexyl and similar amines; aniline, toluidine, alpha-naphthylamine, beta-naphthylamine, N-methyl-aniline, N-ethyl-aniline, phenyl-alpha-naphthylamine, phenyl-beta-naphthylamine, diphenylamine, 2-aminodiphenyl, 4-aminodiphenyl and the analogues and homologues of these compounds. There may also be used compounds containing two or more

groups, such as ethylene diamine, 2,2'-diaminodiethyl sulfide, tetramethylene diamine, hexamethylene diamine, p-phenylene diamine, 4,4'-diaminodiphenyl, guanidine, diphenyl guanidine, di-o-tolyl guanidine, pyrrole, pyrrolidine, piperidine, piperazine, pyrazole, and other similar compounds.

The reaction product of a 2-mercaptothiazoline with a primary amine, being itself a secondary amine, may be further reacted with the same or a different 2-mercaptothiazoline.

The process is carried out by heating the reactants together until the evolution of hydrogen sulfide ceases. The general reaction may be represented as follows:

$$A-SH + B-NH_2 \rightarrow A-NH-B + H_2S$$

or

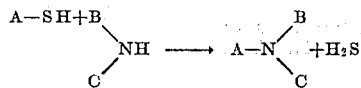

In some cases, the use of an organic solvent as diluent is desirable. Such solvents as benzene, toluene, gasoline, hexane, alcohol, acetones, water, etc., may be used. The temperature or pressure at which the reaction is carried out is not critical, but at temperatures below about 50° C., the reaction is rather slow. Often the boiling point of the amine or diluent used is a desirable temperature for the reaction. If the amine employed is low-boiling, it is preferable to carry out the reaction in an autoclave in order to speed up the reaction and avoid excessive loss of reagent.

If desired, an absorbing agent for the hydrogen sulfide produced may be employed to speed up the reaction and to increase the yield. By "hydrogen sulfide absorbing agent" is meant an inorganic material which reacts readily with hydrogen sulfide to produce a water-insoluble sulfide. Suitable materials comprise the oxides or salts of lead, silver, mercury, bismuth, copper, cadmium, tin, arsenic, antimony, and the like.

In order more fully to illustrate my invention, the following specific examples are given.

Example I

A mixture of 238 parts by weight of 2-mercaptothiazoline and 400 parts of di-n-butylamine was heated to the boiling point (about 116° C.) and kept refluxing at that temperature for two to three hours. Hydrogen sulfide was copiously evolved from the reaction mixture. After cooling, the mixture was washed several times with water and then distilled. The product, 2-(di-n-butylamino) thiazoline, was a light yellow oil which could be distilled at reduced pressure without decomposition.

Example II

A mixture of 357 parts by weight of 2-mercaptothiazoline and 500 parts of cyclohexylamine was heated at reflux temperature for several hours. The product, 2-cyclohexylaminothiazoline, was extracted first with aqueous alkali and then with aqueous hydrochloric acid to remove any unreacted starting materials; after drying, the material was a hard, white granular solid.

Example III

A mixture of 357 parts by weight of 2-mercaptothiazoline and 500 parts of aniline was heated at reflux temperature for about two hours. The product, 2-anilinothiazoline, separated out upon cooling in the form of gray crystals which, after washing with benzene, melted at 157° to 158° C.

Example IV

A mixture of 238 parts by weight of 2-mercaptothiazoline and 400 parts of ethylene diamine was refluxed for about two to three hours. Upon distillation, about 260 parts of ethylene diamine was recovered, indicating that only one molecular proportion of 2-mercaptothiazoline had reacted with one molecular proportion of ethylene diamine. The residue, a soft, brown resin-like material, could not be distilled because of excessive decomposition.

Example V

A mixture of 357 parts by weight of 2-mercaptothiazoline and 342 parts of dimethylpiperazine with about 625 parts of xylene was refluxed for about two hours. After cooling, the mixture separated into a layer of oil and a layer of xylene. The oily layer was distilled to remove the excess xylene, leaving a very viscous syrup, light brown in color. The ratio in which the reagents combined was not certain.

Example VI

A mixture of 119 parts by weight of 2-mercaptothiazoline and 211 parts of diphenylguanidine with 875 parts of xylene was heated at reflux temperature for about six hours. Upon cooling a layer of oil separated from the mixture. This oily layer was heated at reduced pressure to remove the excess xylene. The product, believed to be 2-(diphenylguanidyl) thiazoline, was an extremely viscous oil, dark reddish brown in color.

Similar reactions may be carried out with other similar compounds. Many of the products are very effective as accelerators for the vulcanization of rubber.

Since any amine containing an active hydrogen may be used in my process, several of the products of the foregoing specific examples will react further with a 2-mercaptothiazoline. For example, 2-anilino-thiazoline or 2-cyclohexylamino thiazoline will so react.

Although I have herein disclosed specific examples of my invention, I do not intend to limit myself solely thereto, but to include all the obvious equivalents as embraced by the scope of the appended claims.

I claim:

1. The process of preparing a 2-aminothiazoline which comprises reacting a 2-mercaptothiazoline with an organic compound containing the

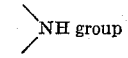

group with the elimination of hydrogen sulfide.

2. The process of preparing a 2-aminothiazoline which comprises reacting a 2-mercaptothiazoline with an amine containing at least one amino hydrogen atom with the elimination of hydrogen sulfide.

3. The process of preparing a 2-aminothiazoline which comprises reacting a 2-mercaptothiazoline with an amine containing at least one amino hydrogen atom with the elimination of hydrogen sulfide in the presence of a hydrogen sulfide absorbing agent.

4. The process of preparing a 2-aminothiazoline which comprises reacting a 2-mercaptothiazoline which, except for the sulfur of the mercapto group and the nitrogen and sulfur of the thiazoline ring, consists of carbon and hydrogen, with a hydrocarbon amine containing at least one amino hydrogen atom with the elimination of hydrogen sulfide.

5. The process of preparing a 2-aminothiazoline which comprises reacting a 2-mercaptothiazoline which, except for the sulfur of the mercapto group and the nitrogen and sulfur of the thiazoline ring, consists of carbon and hydrogen and is free from aromatic rings, with a hydrocarbon amine containing at least one amino hydrogen atom with the elimination of hydrogen sulfide.

6. The process of preparing a 2-aminothiazoline which comprises reacting a 2-mercaptothiazoline which, except for the sulfur of the mercapto group and the nitrogen and sulfur of the thiazoline ring, consists of carbon and hydrogen and is free from aromatic rings, with an aromatic amine containing at least one amino hydrogen atom with the elimination of hydrogen sulfide.

7. The process of preparing a 2-aminothiazoline which comprises reacting a 2-mercaptothiazoline which, except for the sulfur of the mercapto group and the nitrogen and sulfur of the thiazoline ring, consists of carbon and hydrogen and is free from aromatic rings, with an aliphatic amine containing at least one amino hydrogen atom with the elimination of hydrogen sulfide.

8. The process of preparing 2-anilinothiazoline which comprises reacting 2-mercaptothiazoline with aniline with the elimination of hydrogen sulfide.

9. The process of preparing 2-(di-n-butylamino) thiazoline which comprises reacting 2-mercaptothiazoline with di-n-butyl amine with the elimination of hydrogen sulfide.

ROGER A. MATHES.